Feb. 24, 1925.
E. B. STAPFER
GUARD FOR HOOKS
Filed Nov. 11, 1924
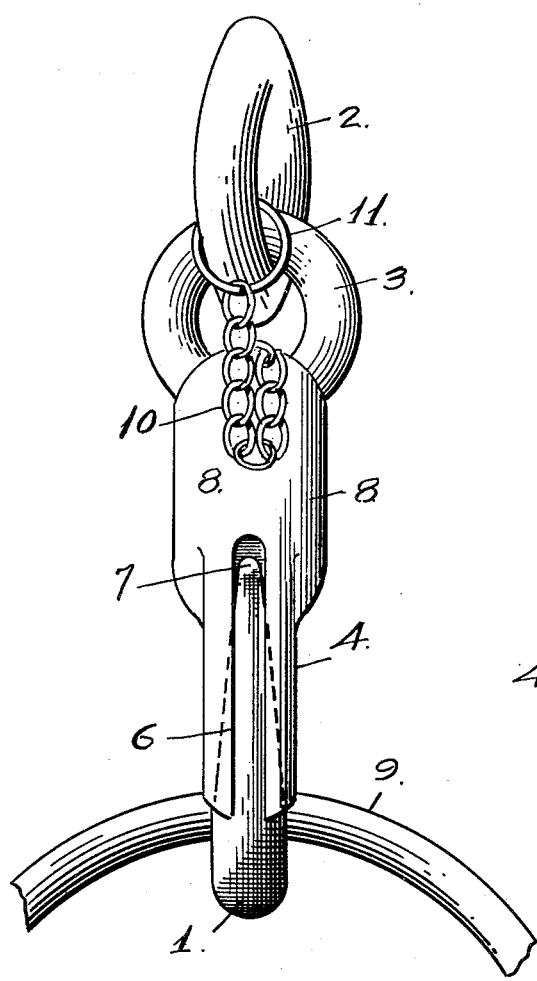
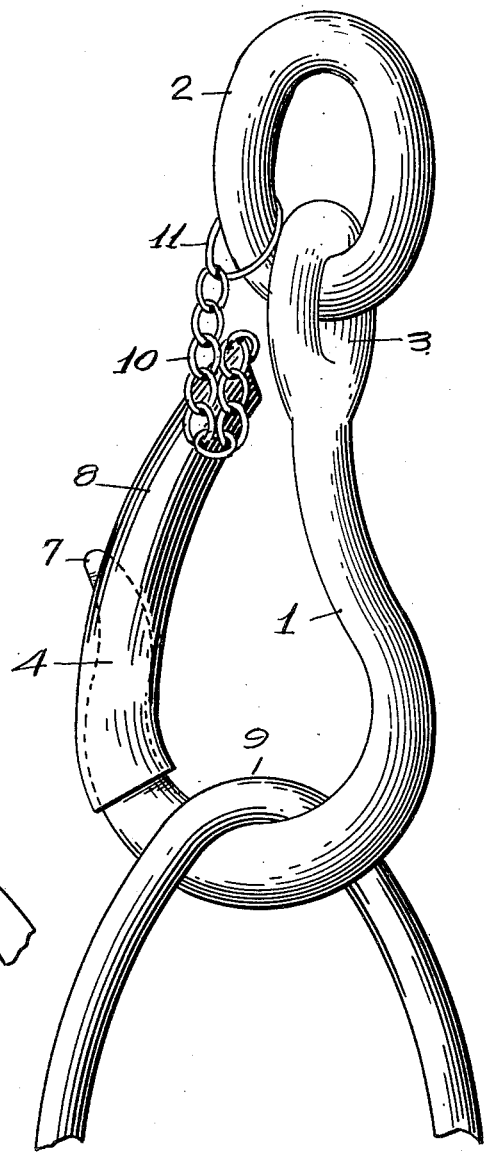
INVENTOR.
EMILY B. STAPFER.
By Arthur L. Lee
ATTY.

Patented Feb. 24, 1925.

1,527,281

UNITED STATES PATENT OFFICE.

EMILY B. STAPFER, OF SAN FRANCISCO, CALIFORNIA.

GUARD FOR HOOKS.

Application filed November 11, 1924. Serial No. 749,247.

*To all whom it may concern:*

Be it known that I, EMILY B. STAPFER, a citizen of the United States, residing in the city and county of San Francisco and State of California, have invented a new and useful Improvement in a Guard for Hooks, of which the following is a specification.

My invention relates to improvements in guards for hooks wherein an arcuate member is recessed to engage the free end of the hook and operates in conjunction therewith for retaining an object in engaging relation with said hook.

The primary object of the present invention is to provide a new and improved guard for hooks.

Another object of the invention is to provide a new and improved hook guard of simple and economical design and arranged to retain pails, buckets and the like, in engaging relation with said hook while said pails or buckets are filled with hot tar or other dangerous contents and are being hoisted over side walks and the like.

A further object of the present invention is to provide a new and improved device of the character described which may be easily and quickly placed in position to prevent objects from being disengaged from a hook while being hoisted.

I accomplish these and other objects by means of the improved device disclosed in the drawings forming a part of the present specification wherein like characters of reference are used to designate similar parts throughout the said specification and drawings, and in which—

Fig. 1 is an end elevation of a hook and thimble disclosing my improved guard attached thereto; and Fig. 2 is a side elevation of Fig. 1.

Referring to the drawings the numeral 1 is used to designate a hook of the usual type having the usual thimble 2 attached to the eyelet 3 of said hook 1.

My improved guard consists of an arcuate member 4 having a recess 6 formed in one portion thereof and arranged to engage the free end 7 of the hook 1, as disclosed in Fig. 1 of the drawings. The upper end of the guard 4 is flattened slightly to form and thereby provide a convenient handle or hand grasp 8. This upper portion of the arcuate guard 4 is arranged to bend back toward the shank of the hook 1 when said guard 4 is in position and thereby substantially close said hook whereby objects, such as the handle 9 of a bucket or pail, not shown, may be effectively retained in engaging relation with said hook 1 while said object is being hoisted by means of said hook.

A suitable chain 10, or any other suitable connection, is fastened at one end to the upper end of the arcuate guard 4 and has its opposite end secured by means of a ring or link 11 to the thimble 2 or to the eyelet 3 of the hook 1 as may be preferred. The chain 10 is provided as a simple and effective means for retaining the guard 4 adjacent the hook 1 when not in operative position, and in order that said guard 4 may be instantly available when required for use in connection with said hook.

The recess 6 is so shaped, in relation to the free end 7 of the hook 1 that it cannot be entirely removed from the said free end 7 of said hook 1 while an object of sufficient weight is suspended to retain the hook 1, thimble 2 and hoisting line, not shown, in alignment for the reason that the upper end of said arcuate guard 4 will abut against said thimble 2 and prevent said guard from being entirely withdrawn from the hook. When the load is released from the hook 1 the thimble 2 may be easily removed from the path of the arcuate guard 4 and as there will be sufficient play between the recess 6 and the eyelet 3 of the hook 1, said arcuate guard may then be moved so that the upper end thereof will pass the eyelet 3 of said hook 1.

It is obvious from the foregoing that when the guard 4 is in position and a weight is being raised by the hook 1, that said weight or object will be kept in engaging relation with the hook 1 and cannot become disengaged therefrom while being hoisted when coming into violent or accidental contact with the side of a building or other structure. By means of this novel arrangement buckets of hot tar or other harmful contents will be prevented from dropping upon pedestrians who may at the time be passing underneath.

Having thus described my invention what I claim as new and desire to secure by Letters Patent is—

1. A guard for hooks comprising a member recessed to engage the free end of a hook and arranged to partially close said hook to retain an object in engaging relation with said hook; and means for loosely connecting said member with the hook whereby said guard may be retained adjacent said hook when not in position thereon.

2. A guard for hooks comprising an arcuate member recessed at one end to fit over the free end of a hook and having its upper end, when the lower end is engaging said hook, bent toward the shank of the hook to retain an object in engaging relation with said hook; and means for loosely connecting said guard with said hook whereby said guard may be held adjacent said hook when not in position thereon.

3. A guard for hooks comprising an arcuate member recessed at one end to fit over the free end of a hook and having its upper end, when the lower end is engaging said hook, bent toward the shank of the hook to retain an object in engaging relation with said hook; and a chain connected to said guard and to the hook whereby said guard may be held adjacent said hook when not positioned thereon.

4. A guard for hooks comprising an arcuate member recessed at the lower end thereof to receive the free end of a hook, the upper portion of said guard being flattened to form a convenient hand-grasp for operating said guard and likewise being curved, when in position on said hook, toward the shank thereof to substantially close said hook to retain an object in engaging relation therewith.

In witness whereof I hereunto set my signature.

EMILY B. STAPFER.